United States Patent
Dackson

(10) Patent No.: US 9,102,009 B2
(45) Date of Patent: Aug. 11, 2015

(54) METHOD AND APPARATUS FOR LASER WELDING WITH MIXED GAS PLASMA SUPPRESSION

(76) Inventor: Christopher Dackson, Ypsilanti, MI (US)

(*) Notice: Subject to any disclaimer, the term of this patent is extended or adjusted under 35 U.S.C. 154(b) by 333 days.

(21) Appl. No.: 13/261,630

(22) PCT Filed: Sep. 12, 2011

(86) PCT No.: PCT/US2011/001580
§ 371 (c)(1),
(2), (4) Date: Apr. 9, 2013

(87) PCT Pub. No.: WO2012/093987
PCT Pub. Date: Jul. 12, 2012

(65) Prior Publication Data
US 2013/0233836 A1   Sep. 12, 2013

Related U.S. Application Data

(60) Provisional application No. 61/403,164, filed on Sep. 10, 2010.

(51) Int. Cl.
*B23K 26/14* (2014.01)
*B23K 26/12* (2014.01)
*B23K 26/24* (2014.01)

(52) U.S. Cl.
CPC ........... *B23K 26/1464* (2013.01); *B23K 26/125* (2013.01); *B23K 26/14* (2013.01); *B23K 26/1405* (2013.01); *B23K 26/1452* (2013.01); *B23K 26/1458* (2013.01); *B23K 26/1476* (2013.01); *B23K 26/24* (2013.01)

(58) Field of Classification Search
CPC ........................... B23K 26/14; B23K 26/1458
USPC ........................ 219/121.63, 121.64, 121.84
See application file for complete search history.

(56) References Cited

U.S. PATENT DOCUMENTS

| | | | | |
|---|---|---|---|---|
| 4,902,359 A | * | 2/1990 | Takeuchi et al. | 148/222 |
| 6,118,097 A | * | 9/2000 | Kaga et al. | 219/121.84 |
| 6,531,682 B1 | * | 3/2003 | Guttler | 219/121.84 |
| 6,864,458 B2 | * | 3/2005 | Widmann et al. | 219/121.69 |
| 7,022,941 B2 | * | 4/2006 | Joseph et al. | 219/121.84 |
| 2004/0245226 A1 | * | 12/2004 | Callies et al. | 219/121.71 |
| 2005/0224470 A1 | * | 10/2005 | Burt et al. | 219/121.63 |
| 2008/0000881 A1 | * | 1/2008 | Storm et al. | 219/121.47 |

FOREIGN PATENT DOCUMENTS

DE   004315849 C1 *  6/1994
JP   406218572 A  *  8/1994

* cited by examiner

*Primary Examiner* — Samuel M Heinrich
(74) *Attorney, Agent, or Firm* — John Chiatalas

(57) ABSTRACT

Machinery and process are disclosed for laser welding. A beam is generated and focused on a discrete work surface, with a distinctive nozzle provided for delivering plasma suppression gas toward the surface. The nozzle has first and second inlets for receiving first and second sources of different plasma suppression gases, respectively. The nozzle has first and second outlets in fluid communication with the first and second inlets, respectively, together directing an externally mixed stream of the gases from the nozzle at an angle of incidence of 35 degrees to 50 degrees relative to the surface to impinge upon the generated plasma. The impinging stream intersects the beam at or above the surface, as the mixed gases are deflected across the beam. The invention saves on helium costs and demonstrably increases weld penetration.

39 Claims, 5 Drawing Sheets

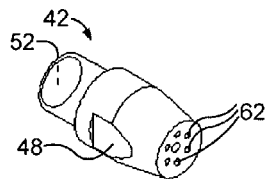
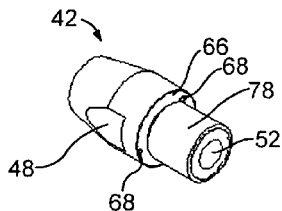
Fig. 3                    Fig. 4
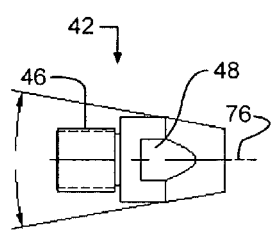
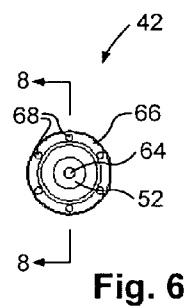
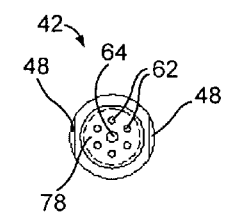
Fig. 5        Fig. 6        Fig. 7
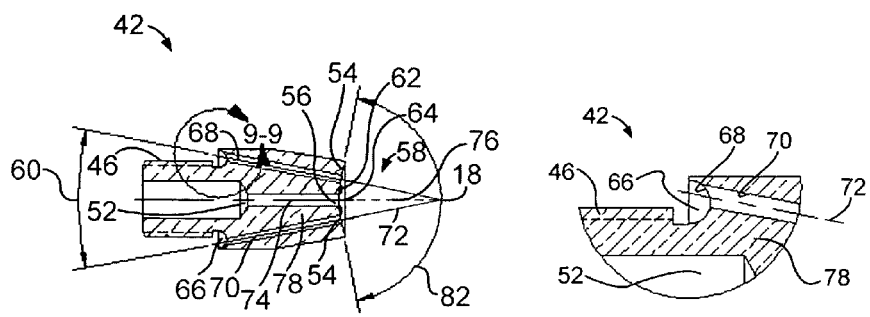
Fig. 8                    Fig. 9

METHOD AND APPARATUS FOR LASER WELDING WITH MIXED GAS PLASMA SUPPRESSION

CROSS-REFERENCE TO RELATED APPLICATION

None

TECHNICAL FIELD

The present invention relates generally to a device and method for delivery of plasma suppression gas in a welding apparatus, and more particularly to a laser welding apparatus.

BACKGROUND

The laser is a device that generates a nearly collimated beam of light energy. When its beam is directed, manipulated and focused with respect to a workpiece, it has a consistency that makes it ideally suited for automated processing. The laser beam delivery system is comprised of components that accept the beam from the laser (and enclose it), direct it to the workpiece, and condition it into a useable form of energy. These generally include, for $CO_2$ lasers: beam bending mirrors, interconnecting beam guard tubes, and may include a beam collimator for moving beam or long beam delivery systems in a reflective system. In addition, the system requires a focus module with a focusing optic, and a plasma suppression gas delivery nozzle. The $CO_2$ laser will be of primary concern in the present Application, but it should be understood this would not be the only type of laser that can benefit from the present invention.

Focus modules provide housing for the focus optic(s). These assemblies must generally be attached to a rigid, linearly adjustable axis which can be used to adjust the focus position relative to the weld joint. Usually about 25 mm (1 inch) is all that is required if only one focal length and one part geometry is to be welded with the system. Focus modules that use a nozzle cone for plasma suppression gas delivery often provide the adjustments required to center the focused beam through the nozzle orifice. With $CO_2$ lasers, glass cover slides cannot be used, instead, an air knife keeps dust and other contaminants off the focus optics.

A plasma suppression gas nozzle is usually integrated with the focusing assembly. It can be either an off-axis auxiliary tube (with or without a nozzle tip) or a nozzle cone attached directly to the focus module. The off-axis tube type generally provides a stream of plasma suppression gas at some angle (usually about 45 degrees) relative to the weld joint/surface, while the cone type provides coaxial flow of plasma suppression gas through the cone which is normally perpendicular to the weld surface (depending on joint geometry). The coaxial or nozzle cone configuration has the advantage of rigidity and pointing stability, as well as consistent plasma suppression for multidirectional welding (e.g. robot welding applications, etc.). The primary advantage of the auxiliary tube style is that the focus unit can be equipped with an air knife to protect the focus optic from weld spatter. Nozzle configuration and design plays an extremely important role when high power welding. The plasma suppression gas must be delivered to the plasma suppression gas nozzle, for which purpose gas bottles, liquid gas containers or bulk vessels are utilized.

Laser welding has been chosen over conventional welding processes (such as resistance spot or arc welding) due to several primary advantages. Minimum heat input and high aspect ratio results in minimal shrinkage and distortion of the workpiece. Consistent, repeatable welds are obtained with a small heat affected zone. The narrow weld bead presents a generally good appearance. The high strength welds often result in an increase in rigidity and a reduction of component size—typically higher static and fatigue strength as compared with the intermittent spots produced via resistance welding. Easily automated and accurately located welds are obtained, which can weld dissimilar materials. There is generally no flux or filler material required. Lasers offer flexibility of beam manipulation (including time sharing), the ability to weld in areas difficult to reach with other techniques and are often faster than other techniques. In some cases, post-processing operations (such as weld bead clean-up) can be eliminated.

Successful laser welding must consider laser process parameters, welding process requirements and related process considerations. Laser process parameters refer to the group of parameters that influence what type of laser is used and how its power is delivered to the workpiece and focused on it, thus providing a useful source of energy. The welding process requirements, on the other hand, refer to the factors, which influence how successfully the focused energy is coupled with the weld joint. The related process considerations define the overall process and part requirements.

The laser beam is comprised of electromagnetic radiation, which is both highly monochromatic (single wavelength) and coherent (in phase). The ability of a laser to weld is primarily attributed to these two characteristics, which allow the beam to be focused to a very small spot (typically 0.1 mm-0.8 mm). Since the laser power is focused to a relatively small spot, the resultant power density (the ratio of laser power to focused spot area) at the workpiece is typically greater than $10^7$ Watts/$cm^2$. At incident power densities of this magnitude or greater a phenomenon results that is referred to in the trade as "keyholing", which makes possible deep penetration continuous laser welding of metal. With excellent laser beam quality, keyholing may occur as low as $10^6$ W/$cm^2$ for steel, and at about $4 \times 10^6$ W/$cm^2$, depending on spot intensity profile (i.e. power distribution). Keyholing occurs when the material at the interaction point melts and vaporizes. The resultant vapor pressure is high enough to overcome the surface tension and forces the molten material out of the way, forming a hole or cavity that captures nearly all of the laser energy via internal reflections. As the workpiece moves relative to the beam, the vaporized material becomes molten and flows back into the cavity and solidifies behind the weld point, forming the weld. Keyholing makes possible remarkable weld depths approaching several centimeters. At incident power densities below that which yields keyhole welding, only melting occurs. This mechanism is referred to as conduction welding. Without the formation of a keyhole (due to insufficient vapor pressure) weld depths are limited to about 1 millimeter.

Power density is defined as the ratio of laser power to the area of the focused spot and is directly related to weld penetration. It is critical in that it encompasses both the laser power and the area in which that power is concentrated. Neither a high power unfocused laser beam nor a low power focused beam is of much use for laser welding. Power density (Pd), is related to laser power (P) and to the area of the focused spot (d) by the following (assuming a focused spot which is circular): $Pd = 4P/\pi d^2$ Energy density is related to the speed at which the power density is imparted into the weld joint. A high speed weld imparts less energy density into the weld joint than does a low speed weld (at a given power density). The available energy density is directly proportional to the power density (Pd) and spot size (d), and inversely proportional to the weld speed (V): $Ed = d(Pd/V)$. The energy density along with the coupling efficiency (the ability of the weld joint and material to use the available energy density of the focused beam), establishes the required weld speed for a desired weld penetration. The coupling efficiency is dependent on many things, a few of which are: laser type, power density, material reflectivity and conductivity, weld joint geometry, weld joint cleanliness and surface condition, the amount of volatile constituents in, or coatings on, the material, and for keyhole welding, the efficiency of plasma suppression (e.g. plasma suppression gas type, flow rate, plasma suppression nozzle geometry, nozzle stand-off, flow direction, etc.).

While the energy density is related to the power density and spot size, the weld energy is related to the power and weld length. The weld energy (E), i.e., how much energy has been utilized for a given length of weld is directly proportional to the power (P) and weld length (w), and inversely proportional to the weld speed (V): $E=w(P/V)$. Energy density (along with coupling efficiency) determines weld penetration and it is directly proportional to power density (and focused spot size), and inversely proportional to weld speed. There is always a trade off between the focused spot diameter and depth of focus with focal length. The power density is decreased when power is decreased via one or more of the following: beam clipping (due to poor alignment or installation site vibration/shifting); beam clipping due to thermal blooming (reflective/transmissive systems); contamination on beam delivery optics or damaged optics; or spatter on focus optic or cover slide. Loss of power generally results in a shallow, narrow weld. Increase in spot size or poor plasma suppression generally results in a shallow, wide weld.

Laser welding usually requires an inert plasma suppression gas to provide protection against oxidation and atmospheric contamination. The most frequently used plasma suppression gases are helium and argon. Industrial or welding grade quality plasma suppression gas is all that is normally required for most welding applications. When welding titanium, however, higher purity plasma suppression gas may be required, depending on the weld requirements. Typically, the plasma suppression gas is directed centrally at the laser/material interface, and if an auxiliary tube design, directed toward the trailing weld (hot material). This will insure protection of the already solidified weld bead that may have sufficient temperature to oxidize. It also helps prevent oxide inclusions and resultant weld porosity and spatter. For high speed, shallow penetration welding, however, directing the plasma suppression gas toward the leading edge (cold material) allows for increased plasma suppression without disturbing the molten pool. Underbead shielding is recommended for full penetration welds. One must allow for plasma suppression nozzle access (including underbead shielding on through penetration welds), and for plasma suppression as required, when designing clamping geometry. Finally, because of the low ionization potential of argon, its plasma suppression performance is subtly poorer to that of helium.

Unlike conventional welding processes, the plasma suppression gas used for $CO_2$ laser welding has two functions, both protection from oxidation & atmospheric contamination, as well as plasma suppression. Although argon is successfully used in many $CO_2$ laser production systems, it can be a very sensitive plasma suppression method in terms of nozzle design and flow geometry. Argon requires less energy to ionize than helium. The ionization potential of Argon is about 15.7 eV whereas Helium has an ionization potential of about 24.5 eV. Argon has an affinity to enhance plasma formation of the metal vapor above the weld pool. This resultant plasma is much more intense than the plasma formed when utilizing helium as a plasma suppression gas and can absorb a vast amount of the laser power. This not only impedes the energy from reaching the workpiece, but also augments the effect by forming more plasma. Helium, however, may also form significant plasma when used with high power lasers or with high focused spot energy densities.

Plasma suppression gas nozzle design and flow geometry are critical parameters for the successful implementation of argon for $CO_2$ welding applications. The basic criterion is to provide a jet of high velocity argon across the molten metal, while simultaneously insuring the argon does not reach a volume and temperature at which plasma formation is imminent. Generally, the greater the power density of the focused beam, the higher the plasma suppression velocity required to suppress plasma formation. With laser powers greater than 10 kW, plasma suppression with argon becomes extremely limited in that the high plasma suppression velocity required is likely to result in unacceptable displacement of the molten metal. Typically, the flow rate of argon [30-45 l/m (66-100 scfh)] required is almost twice that of helium [20-30 l/m (44-66 scfh)] for adequate plasma suppression. Further, since it is crucial to minimize the volume and temperature of the argon at the weld zone, any clamping that would impede the flow of argon, such as slotted clamps, may reduce its effectiveness of suppressing plasma formation. Helium, on the other hand is relatively insensitive to nozzle design and flow geometry. Therefore, when plasma suppression with argon or when plasma suppression with helium under high focused spot energy conditions, more critical plasma suppression techniques may be required.

Laser welding speeds have been found to fit empirical formulas based on the available laser power, focused spot size, properties of the material to be welded, weld joint geometry, and plasma suppression gas type and optimization (especially for high power density keyhole welding).

Keyhole welding is dependent on focused spot power density (i.e. laser power and focused spot size), welding speed, and material melting temperature, material reflectivity, material conductivity, and the like. In general, continuous-wave (CW) keyhole welding of steels and stainless steels is possible above 600 watts. For materials such as aluminum and copper, keyhole welding is generally not possible in the CW range below 1000 Watts.

The plasma suppression gas flow must be adequate, with all appropriate valves open and operating properly including the solenoid valve. Gas from the plasma suppression gas source must be sufficient, of the correct type correct and specified purity. The plasma suppression gas must be directed at the weld with the proper stand-off. The plasma suppression nozzle must be clean and free of weld spatter or other debris. The plasma suppression gas efficiency must not be disturbed by tooling or by excessive flow rates associated with the exhaust, beam delivery purging or focus optic protection. Molten metal will oxidize when plasma suppression is inadequate. If the plasma suppression gas flow rate is excessively high, it can displace molten metal from the weld zone. For plasma suppression to be sufficient, careful attention is required for argon plasma suppression or for helium plasma suppression with high energy density, and for titanium welding.

Costs for operating a laser welding system can be estimated if the application data is known. One way to calculate cost is calculating it per hour, while amortizing some of the more significant maintenance costs into an hourly figure. A given system may be altered and enhanced to suit individual laser products and applications. Plasma suppression gas costs can be calculated by measuring flow rate in standard cubic feet per hour, then multiplying by the average cost per hundred cubic feet of the given gas times length of operation.

PRIOR ART

Keyhole laser welding of materials utilizes a high intensity laser beam ($\geq 10^6$ W/cm$^2$) to melt the intersection of two parts of a component. As the laser moves along the interface of these two materials, it locally melts them creating a cavity at the center area called a keyhole. The materials melt together at the keyhole and then solidify joining the two materials as these move on in the welding process.

The depth of the fused area is dependent upon the power density of the focused laser beam and its ability to reach the component. Plasma that is generated by the ionization of metal vapor coming from the component and the surrounding atmosphere can interfere with the beam energy reaching the component, resulting in a loss of penetration. Thus it is desirable to suppress the plasma produced during the welding process. Plasma suppression means are known in the art. Typically these utilize an inert gas that is blown across the surface of the work piece to remove the plasma.

Non-oxidizing air is also utilized in other methods besides laser welding, which are listed immediately below; however, it must be emphasized here that these other methods do not involve laser welding. Such alternative methods are highlighted here to illustrate that simple substitution of processing steps and materials do not readily translate from one welding method to another because the methods are inherently different.

Published Application No. US 2001/0025833 A1, entitled "Plasma Arc Torch and Method for Cutting a Work Piece", relates to plasma cutting. This publication states the nozzle does its mixing internally, that is, the opposite of a nozzle design that performs the mixing externally. The device is used to enhance cutting capabilities with a secondary oxidizing gas. It is not related to laser welding.

Published Application No. US 2003/0132204 A1, entitled "Welding Head, Nozzle and Method for Powder Plasma Arc Welding", is for a welding nozzle. The nozzle is designed to control powder flow with an outer coaxial nozzle. There is mixing of the two gasses (paragraph 0011, line 4), but the diagram clearly shows that mixing starts just inside of the nozzle. It is not laser related.

Published Application No. 2006/0289398 A1, entitled "Generating Discrete Gas Jets in Plasma Arc Torch Applications", shows a device with nozzle similar to Published Application No. US 2001/0025833 A1. It is used to control plasma through the use of a secondary set of orifices arranged in a coaxial manner. The application states that without the secondary orifice arrangement, the plasma can become unstable. It is not laser related.

U.S. Pat. No. 4,866,240, entitled "Nozzle for Plasma Torch and Method for Introducing Powder into the Plasma Plume of a Plasma Torch":, is directed solely to efficiently introducing powder to a plasma through a series of precisely placed orifices so as to reduce the loss of (or reduce the waste of) the powder. There is no mention of mixing of gasses; rather, focus is solely on the increase of efficiency of a standard plasma transfer arc torch. It is not laser related.

U.S. Pat. No. 5,653,895, entitled "Plasma Cutting Method Suitable for Cutting Stainless Steel Sheet Metal", is aimed at cutting with respect to a plasma torch. The secondary nozzle is used to control dross formation. There is no mixing going on, simply a control of differential pressures. It is not laser related.

U.S. Pat. No. 5,906,758, entitled "Plasma Arc Torch", is directed primarily toward the liquid cooling of a standard plasma torch. It also describes a feature that eliminates the gas swirl or mixing features of a standard plasma torch. This device is like the other plasma torches described above as it is used to control not extinguish the plasma. It is not laser related.

U.S. Pat. No. 6,069,339, entitled "Dual Flow Nozzle Shield for Plasma-Arc Torch", does not concern a mixing nozzle. It uses a single gas with differential flow to achieve better spatter control in a plasma cutting nozzle. It is not laser related.

The following citations do relate to laser welding.

U.S. Pat. No. 4,469,932, entitled "Plasma Burner Operated by Means of Gaseous Mixtures", shows a device used primarily for the protection of a highly heated electrode. It is not laser related. It discloses certain nozzle geometries (i.e. orifice angles of 35 to 45 degrees). These angles appear critical to the operation disclosed and are much greater than the angles discussed herein by the present Applicant.

U.S. Pat. No. 4,377,735 describes the use of a coaxial and transverse gas to effectively eliminate plasma. U.S. Pat. No. 7,241,965 B2 (also discussed later herein) describes the use of both a transverse gas flow with the addition of a suction device to enhance the removal of plasma. Whereas both of these citations are said to enable better depth of penetration, both use a single gas (Helium) unlike Applicant.

U.S. Pat. No. 4,377,735, entitled "Laser Working Treatment Process Capable of Controlling the Form of Heated Portion of a Steel Material", is directed toward controlling the direction of the plasma formed by a high energy density laser. Two gas streams (both Helium) are used to form and extinguish the plasma. The first stream is coaxial to the laser beam to generate plasma while the second stream is off axis and pushes the plasma away.

U.S. Pat. No. 6,469,277 B1, entitled "Method and Apparatus for Hybrid Welding under Shielding Gas", discusses Hybrid Laser Welding, which is the combination of standard GMAW and laser welding. There are no special nozzles used and typically there is no special mixing or plasma control going on in this process, unlike that of Applicant.

U.S. Pat. No. 7,241,965 B2, entitled "Method and Apparatus for Laser Welding with Plasma Suppression", addresses improvements in plasma suppression through the addition of vacuum (suction device) to enhance the velocity of a plasma suppression gas (Argon, Carbon Dioxide, or Helium). The gases are unmixed. The approach is believed to be relatively impractical. The actual gas nozzle is a straight piece of copper tube. Conventional laser welding equipment commonly uses this nozzle design.

The afore-mentioned approaches of others fail to address the ever higher costs and lower efficiencies of using a single gas such as Helium or Argon, particularly the required quantities of Helium in keyhole laser welding processes, e.g., carbon steel or stainless steel tube welding applications.

The prior approaches, where applicable, confine any mixing of plasma suppression gases internally within the nozzle; moreover, these fail to recognize how any mixing step may affect the weld penetration in keyhole laser welding processes.

Accordingly, there is a need in the field of laser welding for improved plasma suppression that significantly reduces the amount of helium used from current levels.

There is also a need for improved plasma suppression that is relatively simple and inexpensive, while easily retrofitting existing laser welding machinery of different manufacturers and model types, which rather quickly returns the acquisition cost.

Therefore it is an object of the present invention to provide equipment and processes that take advantage of cheaper unmixed gas sources, rather than the purchase of more expensive pre-mixed gases; further, it is an object to reduce the need for relatively expensive plasma suppression gas namely Helium.

It is another object of Applicant's invention to achieve improvements in economy while also improving keyhole laser weld penetration versus what has been obtainable in the past using more expensive Helium gas alone.

SUMMARY OF THE INVENTION AND ADVANTAGES

Accordingly, in its various embodiments, the present invention provides apparatus and methods for laser welding, which yield improved plasma suppression results with less helium and better weld penetration.

According to one embodiment, in a laser machine generating a beam focused on a discrete work surface, there is featured a nozzle for delivering plasma suppression gas toward the surface. The nozzle has first and second inlets for receiving first and second sources of different plasma suppression gases, respectively. The nozzle has first and second outlets in fluid communication with the first and second inlets, respectively, together directing an externally mixed stream of the gases from the nozzle at an angle of incidence of 35 degrees to 50 degrees relative to the surface to impinge upon the generated plasma. The impinging stream intersects the beam at or above the surface, as the mixed gases are deflected across the beam. Preferably, the first inlet is laterally spaced from the second inlet. Also preferably, the first outlet is laterally spaced from the second outlet. Again preferably, the first outlet is radially spaced from the second outlet. Still preferably, the first outlet includes a plurality of discrete exit ports spaced from the second outlet. Alternatively, the first outlet includes an exit slot spaced from the second outlet. Further preferably, the first inlet includes a channel for distributing the first plasma suppression gas, which channel more preferably has an annular shape. Still again preferably, the first inlet includes a plurality of discrete entrance ports. Yet preferably, the nozzle has a first passageway situated between the first inlet and first outlet defining a first flow path, as well as a second passageway extending between the second inlet and second outlet, with the first flow path oriented at an angle of incidence between 5 degrees to 10 degrees relative to the second flow path. More preferably, there is a plurality of first passageways circumferentially spaced around the second passageway, both first and second passageways even more preferably being formed from a unitary body. Again more preferably, the first passageway extends along a first axis and the second passageway extends along a second axis. Still more preferably, the first passageway defines a frustoconical cavity that is concentric with the second passageway, which even more preferably is constructed of an assembly having an internal body joined to an external body, with the second passageway being formed within the internal body and the first passageway being formed as a slot between the internal body and the outer body.

According to another embodiment, in a laser welding machine generating a beam focused on a discrete work surface, there is featured a nozzle for delivering plasma suppression gas toward the surface. The nozzle defines a shape with a body having a first inlet and first outlet for conducting a first plasma suppression gas and a second inlet and second outlet for conducting a second, different plasma suppression gas. The first inlet includes a distribution channel and a plurality of circumferentially spaced entrance ports emanating from the distribution channel. The first outlet includes a corresponding plurality of circumferentially spaced exit ports, with a corresponding plurality of first passageways extending along a first axis between the entrance and exit ports, respectively. A second passageway extends along a second axis between the second inlet and second outlet, with the first axis being oriented at an angle of incidence between 5 degrees to 10 degrees relative to the second axis. The plurality of exit ports and second outlet together direct an externally mixed stream of the first and second plasma suppression gases at an angle of incidence of 35 degrees to 50 degrees relative to the surface to impinge upon the generated plasma plume while intersecting the beam at or above the surface as the mixed gases are deflected across the beam.

According to yet another embodiment there is disclosed a laser welding process that employs a laser machine generating a beam focused on a given surface. The process includes the steps of providing a nozzle with first and second inlets and first and second outlets in fluid communication with the first and second inlets, respectively. The process also includes the step of supplying first and second different plasma suppression gases to the first and second inlets, respectively, directing an externally mixed stream of the gases from the nozzle at an angle incident of 35 degrees to 50 degrees relative to the surface, impinging upon the generated plasma and intersecting the beam with the impinging stream at or above the surface as the mixed gases are deflected across the beam. Preferably, the process includes the step of situating the first outlet in radially spaced relationship to the second outlet, more preferably providing the first outlet with a plurality of discrete circumferentially spaced exit ports and situating the exit ports about the second outlet. Alternatively, the process includes the step of providing the first outlet with an exit slot and situating the exit slot concentrically about the second outlet. Preferably, the process includes the steps of providing the first inlet with a channel and distributing the first plasma suppression gas through the channel, which is more preferably formed with an annular cross-section. Also more preferably, the process includes the step of providing a plurality of discrete entrance ports emanating from the distribution channel and a corresponding plurality of discrete exit ports in fluid communication with the entrance ports. Preferably, the process includes the steps of providing a first passageway between the first inlet and the first outlet along a first axis, providing a second passageway extending along a second axis between the second inlet and the second outlet, and orienting the first axis at an angle of incidence between 5 degrees to 10 degrees relative to the second axis. More preferably, a plurality of first passageways is circumferentially spaced around the second passageway, which passageways are further preferably are formed in a unitary body of the nozzle. Alternatively, the first passageway is formed with a generally annular cross-section, defining a frustoconical cavity about the second outlet, which further preferably is formed within an internal body, and the first passageway is formed between the internal body and an external body. Preferably, the process includes the steps of providing a first conduit extending between the first inlet and a source of the first plasma suppression gas and providing a second conduit extending between the second inlet and a source of the second plasma suppression gas. Preferably, the process is a carbon steel welding process including the steps of providing 5-10 standard cubic feet per hour of unmixed carbon dioxide as the first plasma suppression gas and providing 15-20 standard cubic feet per hour of unmixed argon as the second plasma suppression gas. It is alternatively preferred that the process is a stainless steel welding process including the steps of supplying 5-10 standard cubic feet per hour of unmixed helium as the first plasma suppression gas and supplying 15-20 standard cubic feet per hour of unmixed argon as the second plasma suppression gas.

According to still another embodiment there is disclosed a keyhole laser welding process having a laser machine generating a beam focused on a given surface. The process includes the steps of providing a nozzle having a first inlet including a distribution channel, a plurality of entrance ports in fluid communication with the channel, a plurality of exit ports and a plurality of first passageways extending between each of the entrance and exit ports, respectively, defining a first flow path extending along a first axis. The process also includes the steps of providing a second inlet and a second outlet in fluid communication with one another via a second passageway defining a second flow path extending along a second axis. Another step is spacing the plurality of first passageways circumferentially around the second passageway and orienting the first passageways along a first axis at an angle of incidence of 5 degrees to 10 degrees relative to the second axis, while orienting the nozzle at an angle of incidence of 35 degrees to 50 degrees relative to the surface. The process also includes the steps of supplying a first unmixed plasma suppression gas to the first inlet and a second, different unmixed plasma suppression gas to the second inlet while directing an externally mixed stream of the first and second plasma suppression gases from the nozzle, with the stream impinging upon the generated plasma and intersecting the beam at or above the surface as the mixed gases are being deflected across the beam. Preferably, the process is a carbon steel welding process including the steps of supplying 5-10 standard cubic feet per hour of unmixed carbon dioxide as the first plasma suppression gas and supplying 15-20 standard cubic feet per hour of unmixed argon as the second plasma suppression gas. Alternately, the process is a stainless steel welding process including the steps of supplying 5-10 standard cubic feet per hour of unmixed helium as the first plasma suppression gas and supplying 15-20 standard cubic feet per hour of unmixed argon as the second plasma suppression gas.

An advantage of the present invention is mixing pure incoming plasma suppression gases externally as the gases exit from the nozzle tip and flow across the beam prior to impingement of the beam upon the substrate surface.

Another advantage of the present invention is provision of an externally mixed gas for improved suppression of plasma during laser welding, which further enhances weld penetration.

A further advantage of the present invention is improved plasma suppression by relatively simple and inexpensive means that quickly returns acquisition cost, while easily retrofitting existing laser welding machinery of different manufacturers and model types.

An added advantage of the present invention is equipment and processes that take advantage of cheaper unmixed gas sources, versus more expensive pre-mixed gases.

The features and advantages of the disclosure will be set forth in the description which follows, and in part will be apparent from the description, or may be learned by practice of the disclosure without undue experimentation. The features and advantages of the disclosure may be realized and obtained by means of the devices and combinations particularly pointed out in the appended claims.

BRIEF DESCRIPTION OF THE DRAWINGS

FIG. 3 is a perspective view of the plasma suppression nozzle of FIG. 1, showing the head portion with circumferentially spaced exit ports surrounding a central second outlet commonly terminating in a concave distal surface, according to the present invention;

FIG. 4 is a reverse perspective view of FIG. 3, showing circumferentially spaced entrance ports emanating from a common distribution channel surrounding the central second inlet, according to the present invention;

FIG. 5 is a side view of the nozzle head of FIGS. 3-4, showing diametrically opposed flats for securely threading the nozzle head into the sleeve, according to the present invention;

FIG. 6 is a top plan view of FIGS. 3-4, showing the entrance ports surrounding the second inlet, according to the present invention;

FIG. 7 is a bottom plan view of FIGS. 3-4, showing the exit ports surrounding the second outlet, according to the present invention;

FIG. 8 is a sectional view of FIG. 6 taken along Lines 8-8, showing the included angle formed between axes of the first and second passageways, also the included angle formed by the exit ports and distal aperture of the second outlet on the concave distal surface;

FIG. 9 is an enlarged view of the circular area delimited by arcuate Lines 9-9 in FIG. 8, particularly illustrating the distribution channel through which the first plasma suppression gas flows to the first passageways, according to the present invention;

DETAILED DESCRIPTION OF THE PREFERRED EMBODIMENTS

Figures 1, 2:
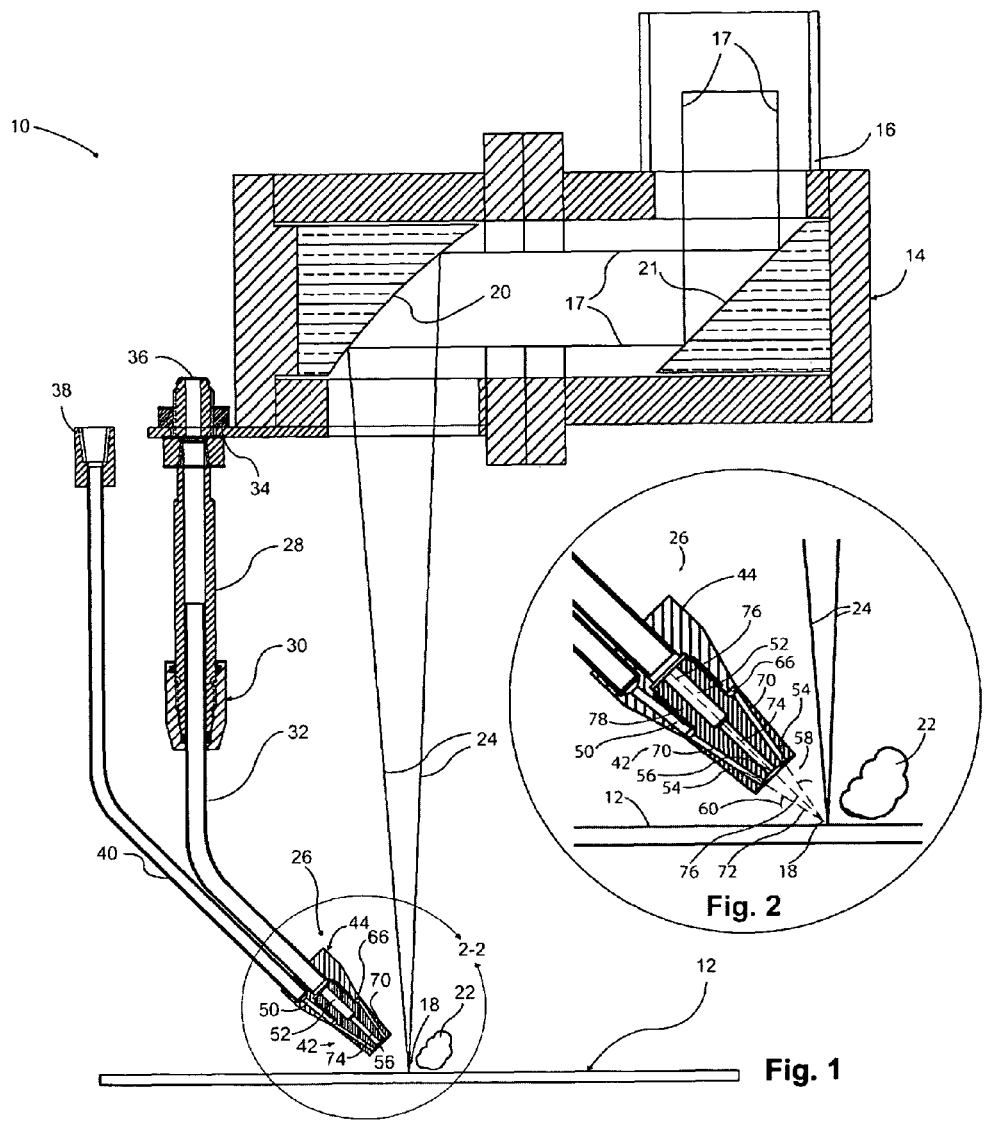
FIG. 1 is an elevational view, cut-away, of a $CO_2$ laser welding machine incorporating a nozzle having preferred shower style head threadedly coupled to a frustoconical sleeve, including first passageways spaced from a second passageway, shown producing externally mixed plasma suppression gas impinging on a representative plasma plume with the nozzle and gas streams directed at selected angles, according to the nozzle and method of the present invention.
FIG. 2 is an enlarged view of the circular area delimited by arcuate Lines 2-2 in FIG. 1, particularly illustrating the angular relationship between the plasma suppression gas streams flowing from the respective passageways and mixing externally of the nozzle, according to the present invention.

Referring to FIG. 1, a laser machine is schematically shown at 10 with its major components situated above a representative work piece 12. A laser focusing head is generally indicated at 14, which can either be mounted to a multi axis numerically controlled motion system (not pictured) or it can be rigidly mounted to a beam delivery system to be described. With laser focusing head 14 rigidly mounted, the work piece 12 is moved below the focusing head that is in fluid communication with a laser emitter (not pictured) via an optical beam conduit 16. For example, a Model DC 060 continuous wave 6.0 kW $CO_2$ laser emitter, marketed by Rofin-Sinar, Inc. of Plymouth, Mich., is suitable using both a gantry (not shown) and fixed beam delivery motion system. This would allow work piece 12 to be welded in both stationary and moving modes.

Still referring to FIG. 1, focusing head 14 concentrates a collimated beam of light 17 from the laser emitter source onto work piece 12 at a focus point 18. This is accomplished by passing collimated laser light 17 through a transmissive or reflective focusing optics 20, 21. At focus point 18 the power density of focused laser light reaches a level $\geq 10^6$ W/cm$^2$, which is great enough to vaporize a small amount of work piece 12 during the creation of a keyhole as elucidated further herein. This metal vapor will combine with any gas in the vicinity to create a plasma cloud 22 above work piece 12.

If plasma cloud 22 is allowed to stand above focus point 18 on work piece 12 a portion of the laser energy will go into sustaining the plasma cloud and thus reducing the amount of available laser energy for sustaining the keyhole welding process. This will reduce the amount of penetration that can be achieved during the welding process. In order to sustain the keyhole process and increase the weld penetration plasma cloud 22 must be extinguished or moved from intersection with the focusing laser beam 24 and above focus point 18 at work piece 12. To accomplish this effectively apart from sole use of a gas with a high ionization potential such as Helium, two gasses are instead directed at or above focus point 18 using a dual gas nozzle of the present invention, generally shown at 26. Dual gas streams are trained in spaced relationship with one another preferably in concentric streams exiting nozzle 26 in an annular pattern, as will be described in greater detail below.

The plasma suppression gasses are supplied to nozzle 26 in unmixed condition, which economizes on cost; otherwise, it is more expensive to buy pre-mixed gases. The gasses are, of course, mixed upon exiting nozzle 26 as will be more particularly described. A combination of any two of the following gasses could be employed, depending on the weld requirements, to-wit: Argon, $CO_2$, Nitrogen, Helium and compressed air. The mixed gasses are delivered from nozzle 26 at a selected angle relative to work piece surface 12. The aiming of these gasses is accomplished via the adjustment sleeve 28 clamped by a lock ring 30, allowing tube 32 to be moved up and down in a focus plane. Adjustment sleeve 28 can be made longer or shorter to accommodate any number of focus lengths reflected from optic 20. Further position adjustment is provided by a swivel ring 34, allowing nozzle 26 to be adjusted along an X or Y plane.

As seen from the enlargement of FIG. 2, the gasses are aimed just above the impingement point 18 of focusing beam 24 and work piece 12. Aiming at point 18 places the gas streams just behind or just before the laser beam impingement point 18 on work piece 12. It is at point 18 that the two gasses mix. Due to a convergence of the two gasses, a very low flow rate is used. Typically only 10 to 20 standard cubic feet per hour (SCFM) is required from each gas.

Introduction of the two gasses comes through a bulkhead fitting 36 for tube 32 that supplies the central gas flow and connection 38 for another tube 40 that supplies the annular gas flow. Typically, Argon, Nitrogen or Air is delivered to nozzle 26 via tube 40. The $CO_2$ gas is delivered via tube 32 for carbon steel laser welding jobs, and alternatively Helium in the case of stainless steel. The flow through tubes 32, 40 is controlled via a gas flow meter (not pictured) that is calibrated for the particular gas being supplied. Balancing the two gasses can be accomplished through these flow meters. This allows an infinite amount of regulation for the material and application at hand, as well as providing accurate tracking of gas usage and costs.

Example

Figure 14:
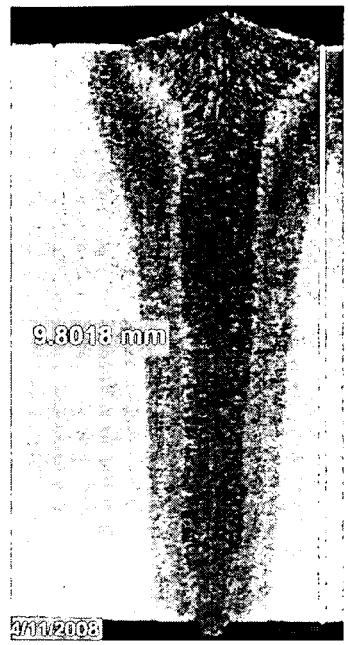
FIG. 14 is a photo micrograph of a keyhole weld prepared for metallographic analysis, showing penetration depth using a combination of externally mixed plasma suppression gases delivered by the nozzle of FIGS. 1-9, according to the present invention.
Figure 15:
FIG. 15 is a photo micrograph of a keyhole weld prepared for metallographic analysis, showing by comparison the penetration depth using helium alone as a plasma suppression gas delivered by a conventional nozzle, under controlled operating conditions.

The gas economy and weld penetration improvements enabled by Applicant's invention have been demonstrated in actual laser welding of mild carbon steel, as well as stainless steel. As marked, the metallographic sample of carbon steel depicted in FIG. 14 reflects a weld penetration depth of 9.8018 mm with Applicant's externally mixed plasma suppression gases $CO_2$ at 10 SCFH plus Argon at 20 SCFH supplied to a dual gas nozzle (FIG. 1) of the present invention. By comparison, FIG. 15 shows a weld penetration into carbon steel of 9.102 mm (marked) using helium alone at a flow rate of 60 SCFH supplied through tube 32, that is, without use of Applicant's dual gas delivery system. A power of 6.0 kW and 1.0 meter per minute feed rate were set in each case. This translates to an improvement of 8% in weld penetration, by practice of the Applicant's invention. It was generally observed in welding mild carbon steel that Helium at 50 to 60 SCFH can be replaced by $CO_2$ at 5 to 10 SCFH plus Argon at 15 to 20 SCFH. From an informal survey of domestic gas prices, Helium is 33% to 50% more expensive than Argon and either $CO_2$ or Nitrogen gasses combined. In laser welding stainless steel, it was observed that usage of Helium at 50 to 60 SCFH can be reduced to Helium at 5 to 10 SCFH plus Argon at 15 to 20 SCFH. From the above data, cost savings can readily be calculated over time.

FIGS. 1-15 illustrate the various embodiments of Applicant's improved apparatus and methods for plasma suppression, particularly during laser welding operations.

Referring to FIGS. 1-13 nozzle 26 has a head portion generally shown at 42, 142 received within a sleeve portion generally indicated at 44 in FIGS. 1-2 by means of threads 46, 146 for which purpose opposed flats 48 are provided (FIGS. 3-5 and 7) to fit a wrench (not shown). In FIGS. 1-2, laser machine 10 generates beam 24 focused on discrete work surface 12, as nozzle 26 delivers first and second plasma suppression gasses from tubes 32, 40 toward the surface. In FIG. 2, nozzle 26 has first 50, 150 and second 52, 152 inlets for receiving the first and second different plasma suppression gases, respectively.

Figure 10:
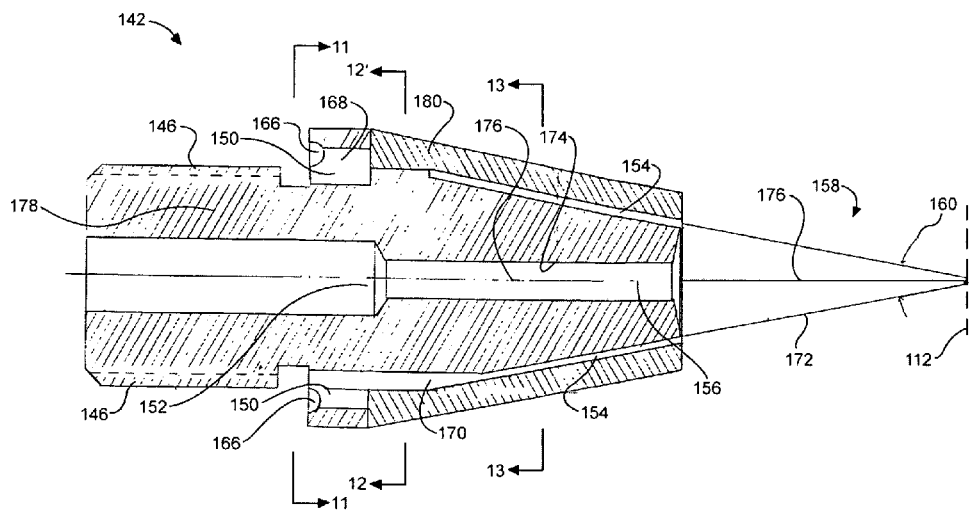
FIG. 10 is an elevational view of a nozzle head, cut away showing a first outlet having annular exit slot concentric with a second outlet according to another preferred embodiment of the present invention.
Figure 11:
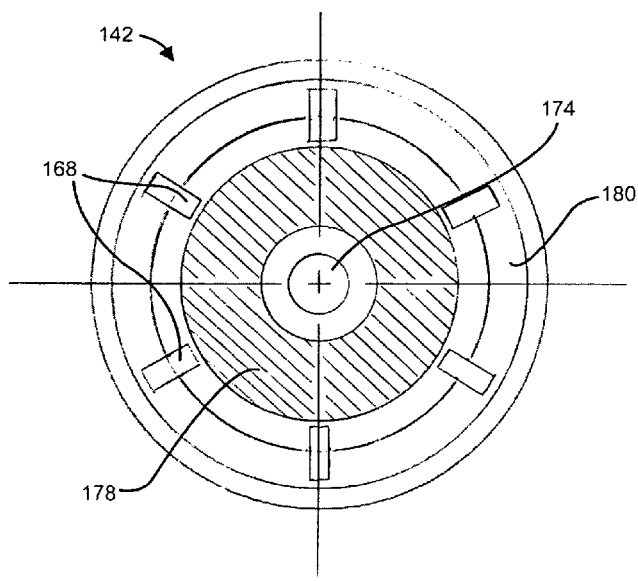
FIG. 11 is a sectional view of FIG. 10 taken along Lines 11-11 in FIG. 10.
Figure 12:
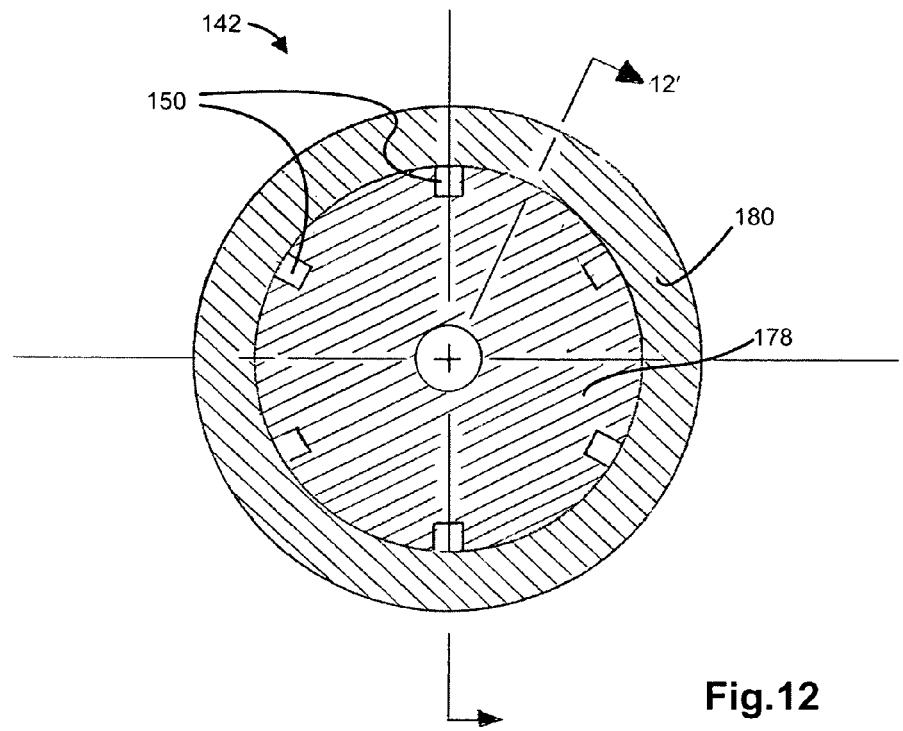
FIG. 12 is another sectional view of FIG. 10, taken along offset Lines 12-12' in FIG. 10.
Figure 13:
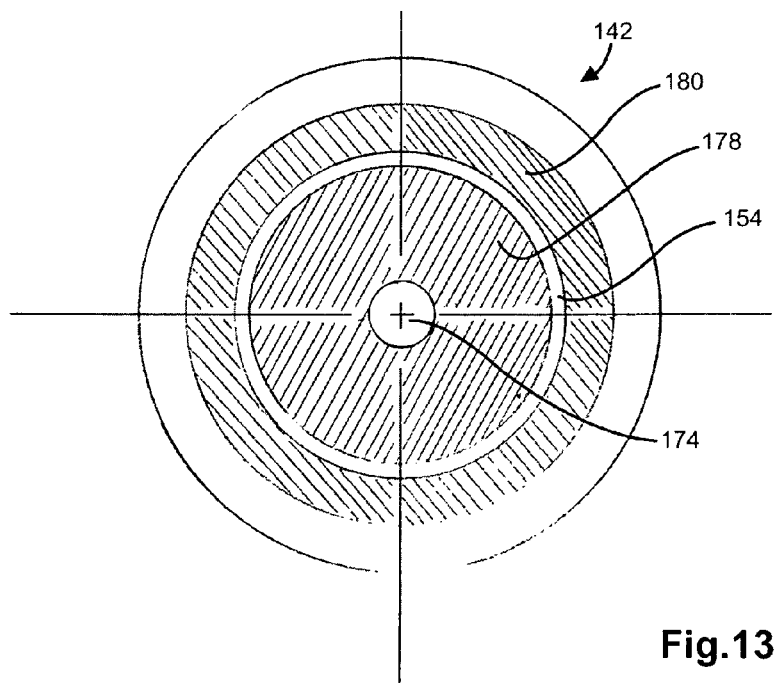
FIG. 13 is yet another a sectional view of FIG. 10, taken along the Lines 13-13 in FIG. 10.

Referring again to FIGS. 1-13, head portion 42, 142 has first 54, 154 and second 56, 156 outlets in fluid communication with first 50, 150 and second 52, 152 inlets, respectively, together directing an externally mixed stream 58, 158 of the gases from nozzle 26 at an included angle 60 of 35 degrees to 50 degrees relative to surface 12, 112 to impinge upon the generated plasma 22 (FIGS. 1-2). Impinging stream 58, 158 intersects beam 24 at or above surface 12, as the mixed gases are deflected across the beam. Preferably, first inlet 50, 150 is laterally spaced from second inlet 52, 152. Also preferably, first outlet 54, 154 is laterally spaced from second outlet 56, 156. Again preferably, first outlet 54, 154 is radially spaced from second outlet 56, 156. Still preferably (FIGS. 1-9) first outlet 54 includes a plurality of discrete exit ports 62 spaced from second outlet 56 as seen in FIGS. 2-3 and 7-8. As seen in FIGS. 10 and 13, a first outlet can alternatively take the form of an exit slot 154 spaced from a second outlet 156. Further preferably and with added reference to FIGS. 2, 8-9 and 11, first inlet 50, 150 includes a channel 66, 166 for distributing the first plasma suppression gas supplied through tube 40 (FIG. 1), which channel more preferably has annular shape depicted in FIGS. 1-2, 4, 6, 8-9 and 10-11. Still again preferably, first inlet 50, 150 includes a plurality of discrete entrance ports 68, 168. Yet preferably, head 42, 142 has a first passageway 70, 170 which more definitively takes the form of a discrete tunnel in FIGS. 1-9 and outlet slot 154 in FIGS. 10 and 13, which is situated between the first inlet 50, 150 and first outlet 54, 154 defining a first flow path represented by first axis 72, 172 as well as a second passageway 74, 174 extending between the second inlet 52, 152 and second outlet 56, 156, with the first flow path oriented at an included angle 60 between 15 degrees and 25 degrees relative to the second flow path represented by second axis 76, 176. More preferably in FIGS. 1-9, there is a plurality of first passageways 70 circumferentially spaced around the second passageway 74, both the first and second passageways even more preferably being formed from a unitary body 78. Again more preferably, the first passageway extends along a first axis 72, and the second passageway extends along a second axis 76. Still more preferably in FIGS. 10-13, the first passageway defines a frustoconical cavity 170 that is concentric with the second passageway 176, which even more preferably is constructed of an assembly having an internal body 178 joined to an outer body 180, with the second passageway 174 being formed within internal body 178 and the first passageway 170 being formed as a slot 154 between the internal body and the outer body.

According to another embodiment shown in FIGS. 1-9, in laser welding machine 10 generating beam 24 focused on discrete work surface 12, nozzle 26 delivers externally mixed plasma suppression gasses toward the surface. Nozzle 26 defines a shape with a body 78 having a first inlet 50 and first outlet 54 for conducting a first plasma suppression gas and a second inlet 52 and second outlet 56 for conducting a second, different plasma suppression gas. First inlet 50 includes a distribution channel 66 and a plurality of circumferentially spaced entrance ports 68 emanating from the distribution channel. The first outlet 54 includes a corresponding plurality of circumferentially spaced exit ports 62, with a corresponding plurality of first passageways 70 extending along a first axis 72 between entrance 68 and the exit ports, respectively. A second passageway 74 extends along a second axis 76 between second inlet 52 and second outlet 56, with first axis 72 being oriented at an included angle 60 between 15 degrees and 25 degrees relative to the second axis 74. The plurality of exit ports 62 and second outlet 64 together direct an externally mixed stream of the first and second plasma suppression gases at an included angle of 35 degrees to 50 degrees relative to the surface 12 to impinge upon the generated plasma plume 22 while intersecting beam 24 at or above the surface as the mixed gases 58 are deflected across the beam.

Referring to FIGS. 2-3, 8 and 10, the exit ports 62 and outlet aperture 64 terminate commonly at a surface delineated by the unitary body 78 at an included angle 82 that is ideally 158 degrees but can vary +/−5 degrees.

According to yet another embodiment discussed for purposes of illustration with respect to FIGS. 1-9, there is disclosed a laser welding process that employs a laser machine 10 generating a beam 24 focused on a given surface. The process includes the steps of providing a nozzle 26 with first 50 and second 52 inlets and first 54 and second 56 outlets in fluid communication with the first and second inlets, respectively. The process also includes the step of supplying first and second different plasma suppression gases through tubes 40, 32 to the first 50 and second 52 inlets, respectively, directing an externally mixed stream of the gases 58 from the nozzle 26 at an included angle of 35 degrees to 50 degrees relative to surface 12, impinging upon the generated plasma 22 and intersecting beam 24 with impinging stream 58 at or above the surface as the mixed gases are deflected across the beam. Preferably, the process includes the step of situating the first outlet 54 in radially spaced relationship to the second outlet 56, more preferably providing the first outlet with a plurality of discrete circumferentially spaced exit ports 62 and situating the exit ports about the second outlet. Alternatively, the process includes the step of providing the first outlet 154 with an exit slot and situating the exit slot concentrically about the second outlet 156. Preferably, the process includes the steps of providing the first inlet 50 with a channel 66 and distributing the first plasma suppression gas through the channel, which is more preferably formed with an annular cross-section. Also more preferably, the process includes the step of providing a plurality of discrete entrance ports 68 emanating from the distribution channel 66 and a corresponding plurality of discrete exit ports 62 in fluid communication with the entrance ports. Preferably, the process includes the steps of providing a first passageway 70 between the first inlet 50 and the first outlet 54 along a first axis 72, providing a second passageway 74 extending along a second axis 76 between the second inlet and the second outlet, and orienting the first axis at an included angle between 15 degrees and 25 degrees relative to the second axis. More preferably, a plurality of first passageways 70 is circumferentially spaced around the second passageway 74, which passageways are further preferably formed in a unitary body 78 of nozzle 42. Alternatively, the first passageway 170 (FIGS. 10-13) is formed with a generally annular cross-section, defining a shape with a frustoconical cavity about the second outlet 174, which further preferably is formed within an internal body 178, and the first passageway 170 is formed between the internal body and an external body 180. Preferably, the process includes the steps of providing a first conduit 40 extending between the first inlet 50 and a source of the first plasma suppression gas and providing a second conduit 32 extending between the second inlet 152 and a source of the second plasma suppression gas. Preferably, the process is a carbon steel laser welding process including the steps of providing 5-10 standard cubic feet per hour of unmixed argon as the first plasma suppression gas and providing 15-20 standard cubic feet per hour of unmixed carbon dioxide as the second plasma suppression gas. It is alternatively preferred that the process is a stainless steel laser welding process including the steps of supplying 15-20 standard cubic feet per hour of unmixed argon as the first plasma suppression gas and supplying 5-10 standard cubic feet per hour of unmixed helium as the second plasma suppression gas.

According to still another embodiment there is disclosed a laser welding process having a laser machine 10 generating beam 24 focused on a given surface 12. The process includes the steps of providing a nozzle 26 having a first inlet 50 including a distribution channel 66, a plurality of entrance ports 68 in fluid communication with the channel, a plurality of exit ports 62 and a plurality of first passageways 70 extending between each of the entrance and exit ports, respectively, defining a first flow path 72 extending along a first axis. The process also includes the steps of providing a second inlet 52 and a second outlet 56 in fluid communication with one another via a second passageway 74 defining a second flow path 76 extending along a second axis. Another step is spacing the plurality of first passageways 70 circumferentially around the second passageway 74 and orienting the first passageways along a first axis 72 at an included angle of 15 degrees to 25 degrees relative to the second axis 76, while orienting the nozzle 26 at an included angle of 35 degrees to 50 degrees relative to the surface 12. The process also includes the steps of supplying a first unmixed plasma suppression gas to the first inlet 50 and a second, different unmixed plasma suppression gas to the second inlet 52 while directing an externally mixed stream of the first and second plasma suppression gases from the nozzle 26, with the stream impinging upon the generated plasma and intersecting the beam at or above the surface as the mixed gases 58 are being deflected across beam 24. Preferably, the process is a carbon steel laser welding process including the steps of supplying 15-20 standard cubic feet per hour of unmixed argon as the first plasma suppression gas and supplying 5-10 standard cubic feet per hour of unmixed carbon dioxide as the second plasma suppression gas. Alternately, the process is a stainless steel welding process including the steps of supplying 15-20 standard cubic feet per hour of unmixed argon as the first plasma suppression gas and supplying 5-10 standard cubic feet per hour of unmixed helium as the second plasma suppression gas.

The present invention is by no means restricted to the above described preferred embodiments, but covers all variations that might be implemented by using equivalent functional elements or devices that would be apparent to a person skilled in the art, or modifications that fall within the spirit and scope of the appended claims.

The invention claimed is:

1. In a laser welding machine generating a beam focused on a discrete work surface, a nozzle for delivering plasma suppression gas toward the surface, the nozzle comprising:
   first and second inlets for receiving first and second sources of different plasma suppression gases, respectively;
   first and second outlets in fluid communication with the first and second inlets, respectively, together directing an externally mixed stream of the gases at an angle of incidence of 35 degrees to 50 degrees relative to the surface to impinge upon the generated plasma; and
   wherein the impinging stream intersects the beam at or above the surface, as the mixed gases are deflected across the beam.

2. The nozzle of claim 1 wherein the first inlet is laterally spaced from the second inlet.

3. The nozzle of claim 1 wherein the first outlet is laterally spaced from the second outlet.

4. The nozzle of claim 1 wherein the first outlet is radially spaced from the second outlet.

5. The nozzle of claim 1 wherein the first outlet further comprises a plurality of discrete exit ports spaced from the second outlet.

6. The nozzle of claim 1 wherein the first outlet further comprises an exit slot spaced from the second outlet.

7. The nozzle of claim 1 wherein the first inlet further comprises a channel for distributing the first plasma suppression gas.

8. The nozzle of claim 7 wherein the distribution channel further comprises an annular shape.

9. The nozzle of claim 1 wherein the first inlet further comprises a plurality of discrete entrance ports.

10. The nozzle of claim 1 further comprising a first passageway between the first inlet and the first outlet defining a first flow path, a second passageway extending between the second inlet and the second outlet defining a second flow path, and wherein the first flow path is oriented at an angle of incidence between 5 degrees to 10 degrees relative to the second flow path.

11. The nozzle of claim 10 further comprising a plurality of first passageways that are circumferentially spaced around the second passageway.

12. The nozzle of claim 10 wherein the first passageway extends along a first axis and the second passageway extends along a second axis.

13. The nozzle of claim 10 wherein the first passageway substantially defines a frustoconical cavity that is concentric with the second passageway.

14. The nozzle of claim 11 further comprising a unitary body having the first and second passageways formed therein.

15. The nozzle of claim 13 further comprising an assembly having an inner body joined to an outer body, the second passageway being formed within the inner body and the first passageway being formed between the inner body and the outer body.

16. A laser welding process using a laser machine generating a beam focused on a given surface, comprising the steps of:
   (a) providing a nozzle with first and second inlets and first and second outlets in fluid communication with the first and second inlets, respectively;
   (b) supplying first and second different plasma suppression gases to the first and second inlets, respectively;
   (c) directing an externally mixed stream of the gases from the first and second outlets at an angle of incidence of 35 degrees to 50 degrees relative to the surface to impinge upon the generated plasma; and
   (d) intersecting the beam with the impinging stream at or above the surface, as the mixed gases are deflected across the beam.

17. The process of claim 16 wherein step (a) further comprises spacing the first inlet laterally from the second inlet.

18. The process of claim 16 wherein step (a) further comprises spacing the first outlet laterally from the second outlet.

19. The process of claim 16 wherein step (a) further comprises providing the first outlet with a plurality of exit ports and situating the exit ports about the second outlet.

20. The process of claim 19 wherein step (a) further comprises situating the plurality of exit ports circumferentially about the second outlet.

21. The process of claim 20 wherein step (a) further comprises forming the first and second inlets and first and second outlets from a unitary body.

22. The process of claim 16 further comprising the steps of providing the first outlet with an exit slot and spacing the exit slot from the second outlet.

23. The process of claim 22 further comprising the steps of situating the exit slot concentrically about the second outlet.

24. The process of claim 23 further comprising the steps of providing the exit slot between the first inlet and first outlet with a generally annular cross-section defining a frustoconical cavity that is concentric with the second outlet.

25. The process of claim 16 further comprising the steps of providing the first inlet with a channel and distributing the first plasma suppression gas of step (b) through the channel.

26. The process of claim 25 further comprising the step of providing a plurality of discrete entrance ports emanating from the distribution channel.

27. The process of claim 26 further comprising the step of providing the distribution channel with an annular cross-section.

28. The process of claim 16 further comprising the steps of providing a first passageway between the first inlet and the first outlet defining a first flow path, providing a second passageway between the second inlet and the second outlet defining a second flow path and orienting the first flow path at an angle of incidence between 5 degrees to 10 degrees relative to a second flow path.

29. The process of claim 28 further comprising the steps of providing a plurality of first passageways and circumferentially spacing the first passageways around the second passageway.

30. The process of claim 29 further comprising the steps of providing a unitary body and forming the first and second passageways therein.

31. The process of claim 24 further comprising the steps of providing an assembly having an internal body joined to an external body, forming the second passageway within the internal body and forming the first passageway between the internal body and the external body.

32. The process of claim 20 further comprising the steps of providing a first conduit extending between the first inlet and the first plasma suppression gas source and providing a second conduit extending between the second inlet and the second plasma suppression gas source.

33. The process of claim 16 further comprising a carbon steel welding process including the steps of providing 5-10 standard cubic feet per hour of unmixed carbon dioxide as the first plasma suppression gas and providing 15-20 standard cubic feet per hour of unmixed argon as the second plasma suppression gas.

34. The process of claim 16 further comprising a stainless steel welding process including the steps of supplying 5-10 standard cubic feet per hour of unmixed helium as the first plasma suppression gas and supplying 15-20 standard cubic feet per hour of unmixed argon as the second plasma suppression gas.

35. A laser welding process having a laser machine generating a beam focused on a given surface, comprising the steps of:
  (a) providing a nozzle having a first inlet including a distribution channel, a plurality of entrance ports emanating from the channel, a plurality of exit ports and a plurality of first passageways extending between each of the entrance ports and exit ports, respectively, along a first axis;
  (b) providing a second inlet, a second outlet and a second passageway extending between the second inlet and second outlet along a second axis;
  (c) spacing the first passageways circumferentially around the second passageway and orienting the first passageways along a first axis at an angle of incidence of 5 degrees to 10 degrees relative to the second axis;
  (d) orienting the nozzle at an angle of incidence of 35 degrees to 50 degrees relative to the surface;
  (e) supplying a first unmixed plasma suppression gas to the first inlet and a second, different unmixed plasma suppression gas to the second inlet; and
  (f) directing an externally mixed stream of the first and second plasma suppression gases from the nozzle, impinging the stream upon the generated plasma while intersecting the beam at or above the surface as the mixed gases are being deflected across the beam.

36. The process of claim 35 further comprising a carbon steel tube welding process including the steps of supplying 5-10 standard cubic feet per hour of unmixed carbon dioxide as the first plasma suppression gas and supplying 15-20 standard cubic feet per hour of unmixed argon as the second plasma suppression gas.

37. The process of claim 35 further comprising a stainless steel tube welding process including the steps of supplying 5-10 standard cubic feet per hour of unmixed helium as the first plasma suppression gas and supplying 15-20 standard cubic feet per hour of unmixed argon as the second plasma suppression gas.

38. In a laser welding machine generating a beam focused on a discrete work surface, a nozzle for delivering plasma suppression gas toward the surface, the nozzle comprising:
  a unitary body having a first inlet and first outlet for conducting a first plasma suppression gas and a second inlet and second outlet for conducting a second, different plasma suppression gas;
  a distribution channel in fluid communication with the first inlet;
  a plurality of circumferentially spaced entrance ports in fluid communication with the distribution channel, a corresponding plurality of exit ports and a corresponding plurality of first passageways extending along a first axis between the entrance and exit ports, respectively;
  a second passageway extending along a second axis between the second inlet and second outlet, with the first axis being oriented at an angle of incidence between 5 degrees to 10 degrees relative to the second axis; and
  wherein the plurality of exit ports and second outlet together direct an externally mixed stream of the first and second plasma suppression gases at an angle of incidence of 35 degrees to 50 degrees relative to the surface to impinge upon the generated plasma plume while intersecting the beam at or above the surface as the mixed gases are deflected across the beam.

39. The nozzle of claim 38 further comprising first and second tubes in fluid communication with the first and second inlets and the first and second sources, respectively, for conducting the first and second plasma suppression gases to the first and second inlets.

* * * * *